(12) United States Patent
Kim et al.

(10) Patent No.: US 6,229,510 B1
(45) Date of Patent: May 8, 2001

(54) LIQUID CRYSTAL DISPLAY HAVING DIFFERENT COMMON VOLTAGES

(75) Inventors: Wan-Bae Kim, Kyungki-do; Seung-Jun Lee, Seoul; Bong-Hyun You, Kyungki-do; Il-Koo Nah, Kyungki-do; Min-Sung Choi, Kyungki-do; Jeong-Weon Seo, Kyungki-do; Dong-Gyu Kim, Kyungki-do, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/120,949

(22) Filed: Jul. 22, 1998

(30) Foreign Application Priority Data

| Jul. 23, 1997 | (KR) | 97-34423 |
| Dec. 31, 1997 | (KR) | 97-80207 |
| Dec. 31, 1997 | (KR) | 97-80208 |
| Apr. 24, 1998 | (KR) | 98-14678 |
| Jul. 15, 1998 | (KR) | 98-28547 |

(51) Int. Cl.$^7$ ................................................. G09G 3/36
(52) U.S. Cl. ........................ 345/87; 345/90; 345/92; 345/95; 349/33; 349/56
(58) Field of Search .............................. 345/87, 89, 90, 345/92, 100, 95, 101, 6, 40; 349/33, 56–58

(56) References Cited

U.S. PATENT DOCUMENTS

| 5,774,099 | * | 6/1998 | Iwasaki et al. | 345/87 |
| 5,798,741 | * | 8/1998 | Kajihara | 345/95 |
| 6,005,542 | * | 12/1999 | Yoon | 345/92 |
| 6,052,104 | * | 4/2000 | Lee | 345/92 |

FOREIGN PATENT DOCUMENTS

| 5-341732 | 12/1993 | (JP) . |
| 6-161390 | 7/1994 | (JP) . |

* cited by examiner

*Primary Examiner*—Dennis-Doon Chow
*Assistant Examiner*—Tewolde Mengisteab
(74) *Attorney, Agent, or Firm*—Myers Bigel Sibley & Sajovec

(57) ABSTRACT

The present invention applies different common voltages to common electrodes corresponding to both end points of gate lines and data lines. At this time, the highest common voltage is applied to a common electrode point far away from both a data driver and a gate driver, the second highest common voltage is applied to a common electrode point close to the data driver and far away from the gate driver, the third highest common voltage is applied to a common electrode point far away from the data driver and close to the gate driver, and the lowest common voltage is applied to a common electrode close to both of the data driver and the gate driver.

19 Claims, 10 Drawing Sheets

LIQUID CRYSTAL DISPLAY HAVING DIFFERENT COMMON VOLTAGES

BACKGROUND OF THE INVENTION (a) Field of the Invention

The present invention relates to a liquid crystal display (LCD). More particularly, this invention relates to a thin film transistor (TFT) LCD having different common voltages.

(b) Description of the Related Art

A TFT-LCD is a display device for displaying image by applying an electric field to a liquid crystal which has a dielectric anisotropy and is interposed between a pair of panels facing each other, and by varying the field intensity to vary the transmittance of light.

The TFT-LCD has a substrate where a plurality of gate lines and a plurality of data lines are formed thereon. The gate lines and the data lines intersect each other and form a plurality of pixels which are surrounded by the gate and data lines. The pixel includes a TFT.

FIG. 1 shows an equivalent circuit of the pixel in the TFT-LCD.

As shown in FIG. 1, the TFT-LCD has a TFT having a gate electrode g, a source electrode s and a drain electrode d connected each to a gate line Gn, a data line Dm and a pixel electrode P. The liquid crystal is interposed between the pixel electrode P and the common electrode Com and is represented with the liquid crystal capacitor Clc. A storage capacitor Cst is formed between the pixel electrode P and a previous gate line Gn-1 and a parasitic Cgd is formed between the gate electrode g and the drain electrode d, due to the misalignment of patterns. The TFT-LCD mentioned above operates as follows.

First, the TFT 10 is turned on by applying a gate-on voltage to the gate electrode connected to the gate line Gn and then a data voltage representing the image signal is applied to the source electrode s and the data voltage is applied the drain electrode d through the TFT 10. Consequentially, the data voltage is applied to the liquid crystal capacitor Clc and the storage capacitor Cst via the pixel electrode P respectively and therefore the electric field is generated by a voltage difference between the pixel electrode P and the common electrode Com. At this time, if the same-directional electric field is continuously applied to the liquid crystal, the liquid crystal is degraded. For this reason, in the LCD panel, for the purpose of preventing the degradation of the liquid crystal, the image signal is driven by alternately changing plus and minus in comparison with the common voltage. The driving method like this is called as inversion driving method.

Meanwhile, the voltage applied to the liquid crystal capacitor Clc and the storage capacitor Cst while the TFT turns on, should be maintained till the TFT turns off. However, due to the parasitic capacitance Cgd between the gate electrode and the drain electrode, the voltage applied to the pixel electrode happens to be distorted. The distorted voltage like this is called as a kick-back voltage and the kick-back voltage is got by following formula.

$$\Delta V = \frac{Cgd}{Cgd + Cst + Clc} \times \Delta Vg \quad (1)$$

Herein, ΔVg means a changing amount of the gate voltage.

The voltage distortion, irrespective of the polarity of the data voltage, always lowers the voltage of the pixel electrode as shown in FIG. 2.

In FIG. 2, Vg, Vd and Vp represent the gate voltage, the data voltage and a voltage of the pixel electrode respectively. Vcom and ΔV indicate a voltage of the common electrode (common voltage) and the kick-back voltage respectively.

As shown in FIG. 2 with dot lines, in an ideal TFT-LCD, the data voltage Vd applied to the pixel electrode while the gate voltage Vg is in 'on' state, is maintained even if the gate voltage turns off. However, in a real TFT-LCD, as shown in FIG. 2 with lines, the voltage of the pixel electrode is lowered by the kick-back voltage in a point where the gate voltage changes due to the kick-back voltage.

On the other hand, a root mean square (RMS) electric field applied to the liquid crystal is determined by the area between the pixel voltage Vd and the common voltage Vcom. Therefore, if the LCD is driven by the inversion driving method, the common voltage level needs to be adjusted so that the area of the pixel voltage for the common voltage is symmetric. This is because that if the area of the pixel voltage Vp for the common voltage Vcom is not symmetric, the amount of the pixel voltage charged in each pixel becomes different by a frame, and therefore whenever the pixel voltage is inverse, it happens the flicker. Consequentially, in a conventional manner, a fixed common voltage being symmetric with the area of the pixel voltage was applied to the common electrode.

However, even if the fixed common voltage is applied to the common electrode for the purpose of preventing the flicker, it happens the flicker yet for the following reason.

Generally, there are a resistance and a parasitic capacitance in the gate line and the data line as shown in FIG. 3.

Though a plurality of the gate lines and a plurality of the data lines are actually formed on the LCD panel 20, only a gate line Gi and a data line Dm are shown for convenience in FIG. 3.

Since the gate line Gi and the data line Dm include a resistance Rg, Rd and the parasitic capacitance Cg, Cd, the gate voltage and the data voltage are delayed by a time constant determined by a multiplication of the resistance and the parasitic capacitance. The voltage delay becomes larger as the size of the LCD panel increases.

FIG. 4 shows the measuring value of the gate voltage Vg delayed according to the length of the gate line. Vg1 and Vg2 indicate the gate voltage measured in the close point A and the far away point B of the gate line from the input terminal of the gate voltage respectively.

As shown in FIG. 4, the changing amount of the gate voltage becomes smaller as it becomes farther away from the input terminal of the gate voltage, that is, the delay of the gate voltage becomes larger. Accordingly, as can be known in Formula 1, the kick-back voltage ΔV becomes smaller.

Since the common voltage is not maintained to a mid value of the pixel voltage if the common voltage is applied constantly, the voltage value charged in the pixel by the frame becomes different and it cause to happen the flicker. The phenomena of the flicker becomes more serious as the screen of the LCD becomes larger.

Meanwhile, since the data voltage as same as the gate voltage is delayed due to the resistance Rd and the parasitic capacitance Cd, the waveform of the data voltage applied to the pixel electrode is distorted and accordingly the charging amount of the pixel voltage of the close point C and the far away point D from the input terminal of the data voltage becomes different.

FIG. 5 shows the difference in the charging amount of the pixel voltage due to the delay of the data voltage.

As shown in FIG. 5, if the data voltage is applied to the data line Dm, the voltage Vd1 of the close point C from the input terminal becomes the data voltage Vd without a signal delay but the voltage Vd2 of the far away point D from the input terminal does not become the data voltage Vd till it is delayed by the time constant τ. Therefore, as shown with a hatched region in FIG. 5, the data voltage is less charged in the pixel of the D point than in the pixel of the C point by the ΔVd.

The difference of the charging amount affects a brightness of an image and therefore degrades the image quality. This problem becomes more serious as the panel of the LCD becomes larger.

SUMMARY OF THE INVENTION

An object of the invention is to overcome the above described problems. Another object of the invention is to prevent the flicker due to the gate voltage delay and the ununiformity of the image due to the data voltage delay.

BRIEF DESCRIPTION OF THE DRAWINGS

These and other features and advantages of the present invention may be better and more completely understood by studying the following detailed description of the presently preferred embodiments together with the appended drawings, of which.

DETAILED DESCRIPTION OF THE PREFERRED EMBODIMENTS

Figure 1:
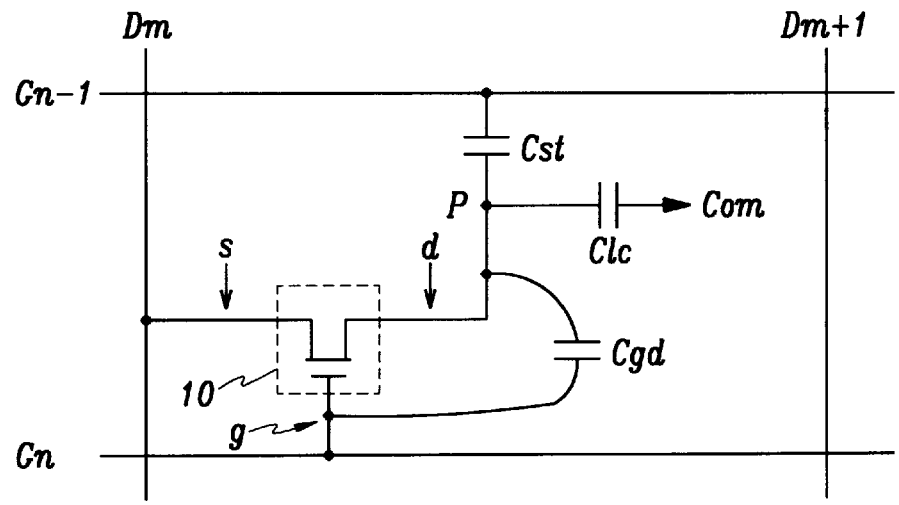
FIG. 1 shows an equivalent circuit on a pixel in TFT-LCD.
Figure 2:
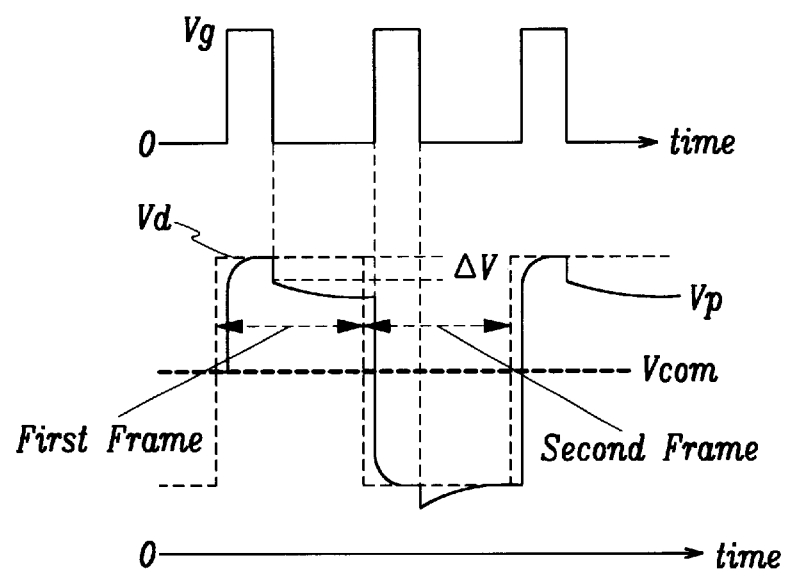
FIG. 2 shows a voltage distortion due to a kick-back voltage.
Figure 3:
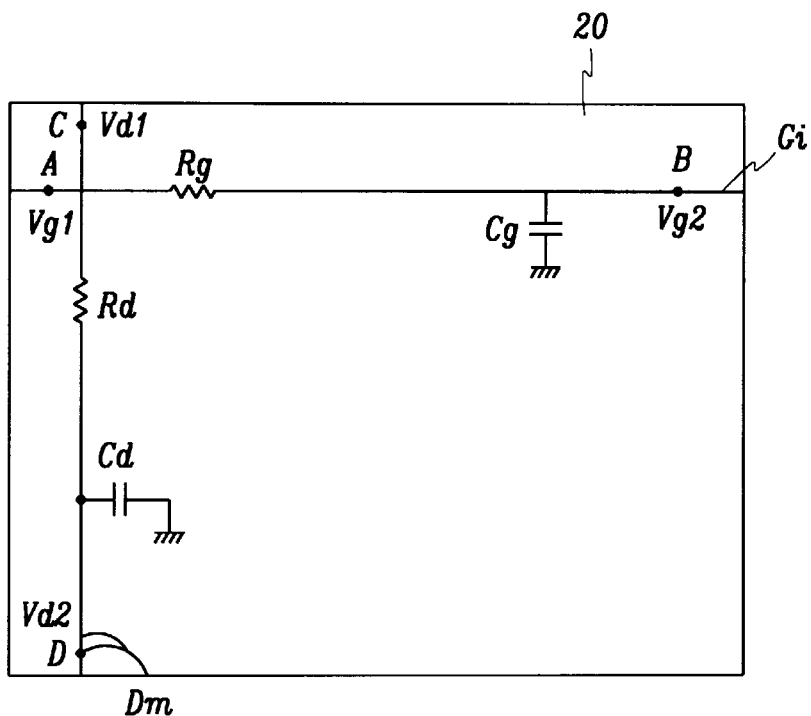
FIG. 3 roughly shows a data line and a gate line having a resistance and a parasitic resistance on a panel of a LCD.
Figure 4:
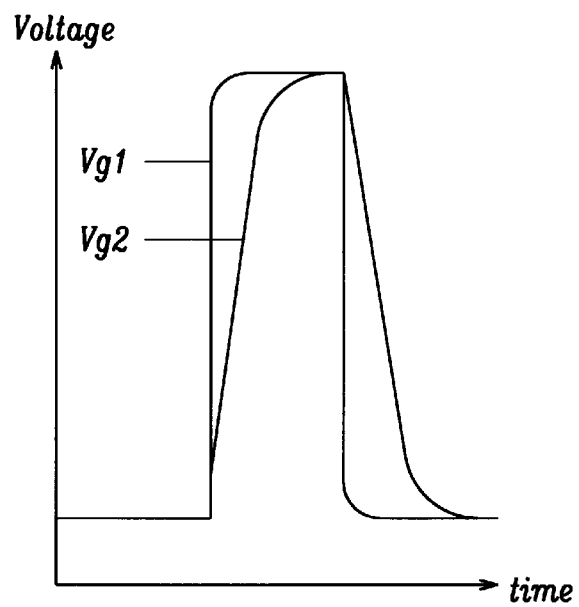
FIG. 4 shows a measuring value of a gate voltage Vg delayed due to a length of the gate line.
Figure 5:
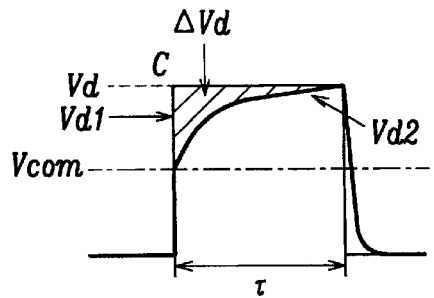
FIG. 5 shows a difference in charging amount of a pixel voltage due to a delay of a data voltage.

In order to achieve the above objects, the present invention applies different common voltages to the common electrode corresponding to end points of the gate line or end points of the data line.

At this time, the smaller common voltage is applied to the common electrode close to the gate driver than the common electrode far away from the gate driver and accordingly the flicker due to the delay of the gate voltage may be prevented.

Further, if the data voltage is greater than the common voltage, the smaller common voltage is applied to the common electrode close to the data driver than the common electrode far away from the data driver. If the data voltage is smaller than the common voltage, the greater common voltage is applied to the common electrode close to the data driver than the common electrode far away from the data driver.

On the other hand, an LCD in accordance with one aspect of the present invention comprises a first substrate which includes a plurality of the gate lines, a plurality of the data lines, a plurality of the TFTs and the pixel electrodes, and is a rectangular made up of a first edge to a fourth edge; a second substrate which includes a common electrode facing the pixel electrode; a gate pad and a data pad formed in the first edge and the second edge respectively and connected to the gate lines and the data lines respectively; a first sealant formed in the third edge for adhering the first substrate to the second substrate and having a liquid crystal injection hole for pouring the liquid crystal; a second sealant which is formed in the liquid crystal injection hole and seals the liquid crystal material after pouring the liquid crystal in; a first to a fourth common electrode points which are formed on the four edges of the common electrode and the common voltage is applied to; a dummy pad which is connected to the first, the second and the third common electrode points respectively and the different common voltages are applied to; and a common connection line which is formed on the third edge of the second substrate and connects the third common electrode point with the fourth common electrode point.

Herein, it is preferred that the common connection line is formed to expose the second sealant. Further, it is preferred that the first sealant located in third edge of the first substrate is formed along with the common connection line and the corresponding part in the common connection line is formed more narrowly than the other parts.

On the other hand, an LCD in accordance with the other aspect of the present invention comprises a first substrate which includes a plurality of the gate lines, a plurality of the data lines, a plurality of the TFTs and the pixel electrodes; a gate pad which is formed on the first substrate, connected to the gate line and applied a gate voltage turning on or off the TFT to; a data pad which is formed on the first substrate, connected to the data line and applied a data voltage representing an image signal to; a display area showing the image signal and comprising a set of the pixel in a matrix type defined as an intersection part between the data lines and the gate lines; a second substrate which includes a common electrode facing the pixel electrode each other; four contact points formed adjacent to four corners of the display area and having an electrical contact with the common electrode; a common voltage generator applying the different common voltages to the four contact points and the four connection lines for connecting the four contact points with the common voltage generator respectively.

Wherein, it is preferred that an operational amplifier is included in the connection line which connects the farthest located contact point from both the gate pad and the data pad with the common voltage generator.

Further, it is preferred that the voltage which the common voltage generator applies to the four contact points is the first highest in the farthest located contact point from both the data pad and the gate pad, the second highest in the contact point close to the data pad and far away to the gate pad, the third highest in the contact point far away from the data pad and close to the gate and the lowest in the contact point close from both the data pad and the gate pad.

Meanwhile, an LCD in accordance with the other aspect of the present invention comprises a first substrate which includes a plurality of the gate lines, a plurality of the data lines, a plurality of the TFTs and the pixel electrodes; a second substrate which includes a common electrode facing the pixel electrode each other; a gate driver for applying a gate voltage turning on or off the TFT to the gate line; a data driver for applying a data voltage representing an image signal to the data line; a voltage generator for applying the different common voltages to the common electrode.

Wherein, the voltage generator comprises a signal delay detector for detecting the delayed gate voltage from the gate line; a delay comparator for converting the delayed voltage detected from the signal delay detector into a digital signal; and a common voltage generator for generating the common voltage compensating the delayed voltage responsive to the digital signal input from the delay comparator.

Further, the voltage generator comprises a supply voltage; a first resistor having one terminal connected to the supply voltage; a first port connected the other terminal of the first resistor and a first point of the second substrate corresponding to a former part of the gate line; a second port connected to a second point of the second substrate corresponding to a latter part of the gate line; and a second resistor having one terminal connected to the second port and the other terminal grounded.

Hereinafter, embodiments of the present invention is described in detail with reference to the drawings.

Figure 6:
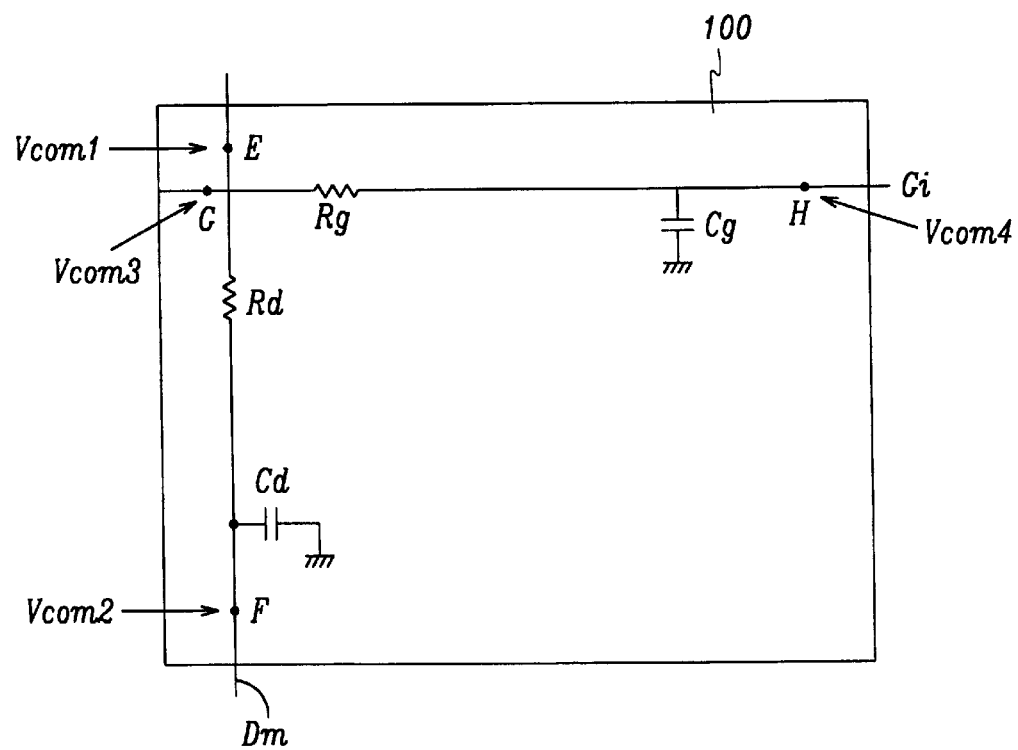
FIG. 6 roughly shows the present invention.

FIG. 6 roughly shows the present invention.

As shown in FIG. 6, in the first embodiment of the present invention, the different common voltages Vcom1, Vcom2 are applied to both end points E, F of the data line and the different common voltages Vcom3, Vcom4 are applied to both end points G, H of the gate line.

That is, in order to lessen the ununiformity of image due to the delayed signal of the data line, the different common voltages Vcom1, Vcom2 are applied to the end points E, F of the LCD panel 100 respectively and in order to prevent the flicker due to the delayed signal of the gate line, the different common voltages Vcom3, Vcom4 are applied to the end points G, H respectively.

Figure 7:
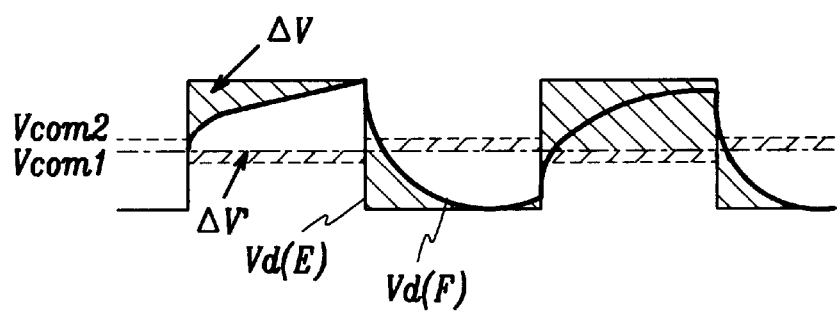
FIG. 7 shows waveforms of the data voltage and a common voltage in a point E and a point F of FIG. 6.

FIG. 7 shows the waveform of the data voltage Vd(E) and the common voltage Vcom1 applied to the end point E in FIG. 6 and the waveform of the data voltage Vd(F) and the common voltage Vcom2 applied to the end point F.

As shown in FIG. 7, in the end point F where the data voltage happens to be distorted, for the purpose of compensating the distorted amount $\Delta V$ of the data voltage, the common voltage Vcom2 compensated by $\Delta V'$ is applied and accordingly the voltage charging amounts of the end points E and F are made to be equal. That is, by adjusting the common voltage Vcom2 to make $\Delta V'$ and $\Delta V$ equal, charging amount in the pixel electrode can be equal.

At this time, if the data voltage Vd(E) (plus voltage) greater than the common voltage Vcom1 is applied, the common voltage Vcom2 becomes the voltage lower than the common voltage Vcom1 by $\Delta V'$. If the data voltage Vd(E) (minus voltage) lower than the common voltage Vcom1 is applied, the common voltage Vcom2 becomes the voltage greater than the common voltage Vcom1 by $\Delta V'$.

A data voltage compensation method to maintain the uniformity of the image can be used to a large size LCD which the data voltage is applied from an upper terminal and a lower terminal of the panel. In this case, since the data voltage is deeply distorted in a center of the panel, the common voltage for compensation is provided from the center of the panel.

Meanwhile, for the purpose of decreasing the flicker caused by the delayed signal of the gate line, the different common voltage Vcom3, Vcom4 are applied to the points G, H of the panel.

That is, in the embodiments of the present invention, in order to prevent the flicker happening when the kick-back voltage in the point H due to the signal delay of the gate lines is smaller than the kick-back voltage in the point G, the common voltage Vcom4 applied to the point H is made to be greater than the common voltage Vcom3 applied to the point G. Accordingly, each common voltage Vcom3, Vcom4 can be located in a center of the pixel voltage and the flicker caused by the delayed signal of the gate line can be prevented.

Figure 8:
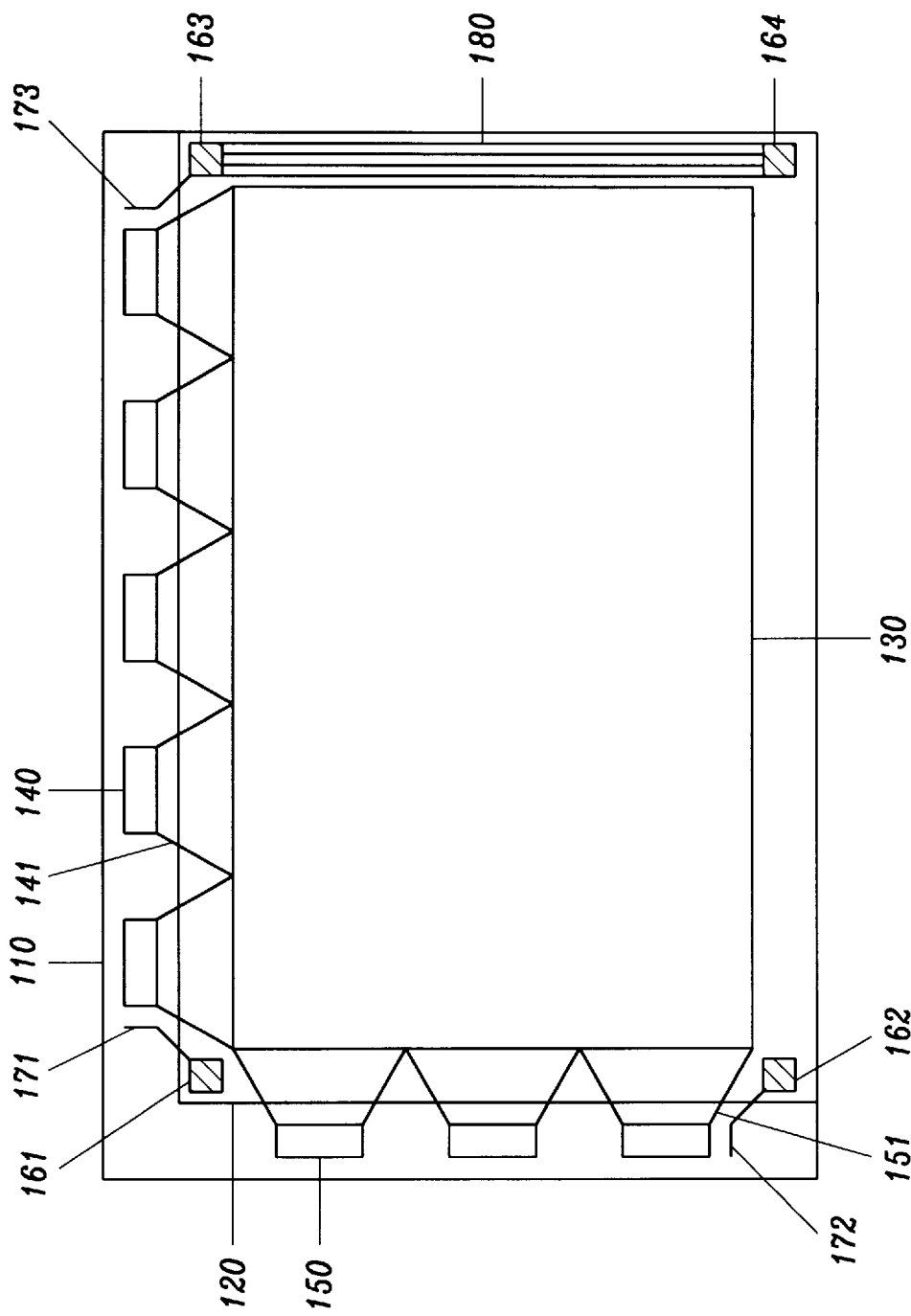
FIG. 8 roughly shows a structure of the LCD in accordance with a first embodiment of the present invention.

FIG. 8 roughly shows the structure of the LCD in accordance with the first embodiment of the present invention.

As shown in FIG. 8, the LCD in accordance with the first embodiment comprises a first substrate 110, a second substrate 120 facing with the first substrate. Herein, generally, the TFT and the pixel electrode are formed on the first substrate 110 and the first substrate is called as a TFT substrate. Further, a color filter and the common electrode are formed on the second substrate 120.

There is a display area comprising a plurality of the pixels representing the image signal in a center of the two substrate 110, 120. A upper part of the exposed first substrate 110 is connected to a plurality of the data lines (are not shown) and the data pad 140 transmitting the data voltage from an external is formed. Further, a left terminal of the exposed first substrate is connected to a plurality of the gate lines (are not shown) and the gate pad 150 transmitting the gate voltage from the external is formed. A connection parts 141, 151 for connecting the gate line and the data line with each pad 140, 150 are formed respectively.

The four common electrode contact points 161, 162, 163 and 164 are formed in the corner exterior to the display area 130. The contact points 161, 162, 163 and 164 receives the common voltage from the external via the dummy pads 171, 172, 173 formed next to the pads 140, 150 for spare. Further, the two contact points 163, 164 formed on a right terminal of the two substrate 110, 120 are connected to the common connection line 180 and the common connection line 180 is made of a plurality of wires composed of a low-resistance metal layer to minimize a voltage drop caused by a resistance of the common connection line.

Herein, the different common voltages Vcom3, Vcom4 are applied to the common electrode contact points 161 and 162, 163 and 164 respectively and therefore the flicker by the delayed signal of the gate line is prevented.

However, in the first embodiment of the present invention in FIG. 8, if the liquid crystal is poured between the two substrates 110, 120 and the sealant seals the two substrates. It happens the problem as follows.

Generally, in the last steps fabricating the LCD panel, when the liquid crystal injection hole (is not shown) is sealed with the sealant (is not shown) after the liquid crystal is poured between the two substrates, the sealant is made to be hardened by irradiating an ultra violate. In this case, in the embodiment of the present invention in FIG. 8, since the common connection line 180 made up of a non-transparent metal layer is formed on a part corresponding to the liquid crystal injection hole, the sealant is slow to be hardened by blocking the ultra violate irradiated to harden the sealant. Accordingly, there is a problem that the sealant not hardened completely penetrates to the display area 130.

Figure 9:
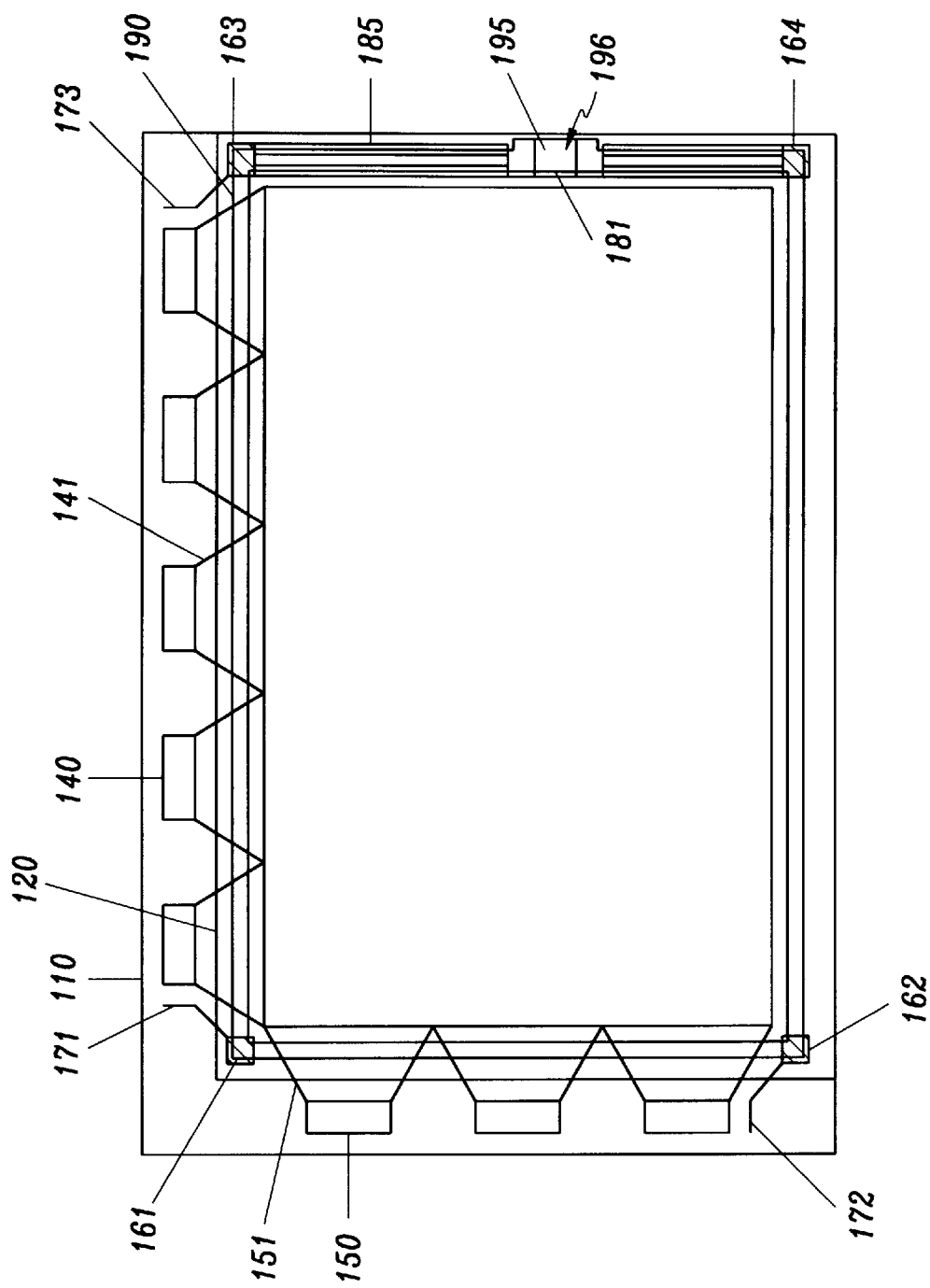
FIG. 9 roughly shows a structure of the LCD in accordance with a second embodiment of the present invention.

FIG. 9 shows the second embodiment upgrading the structure of the LCD in accordance the first embodiment of the present invention.

In FIG. 9, the same references are attached to the contents as same as the contents described in FIG. 8 and the repeated description is omitted.

In FIG. 9, the first sealant 190 is formed around the edges of the display area 130, the liquid crystal injection hole 196 for pouring the liquid crystal in is formed on a partial part next to a right edge of the display area 130 among the first sealant and the second sealant for sealing after pouring the liquid crystal in is formed on the liquid crystal injection hole 196.

The common connection line 185 is formed as different as that of the first embodiment in FIG. 8. That is, the non-transparent metal layer is not formed on the part corresponding to the second sealant 196 and a single wire 181 is formed in a part where the second sealant is not located among parts corresponding to the liquid crystal injection hole 195.

At this time, it is preferred that if the common connection line 181 is formed in a single wire, the part corresponding to the second sealant is formed in a more narrow width than other parts for not blocking the ultra violate irradiating for hardening the second sealant.

Further, it is preferred that the first sealant 190 is formed to be overlap with the common connection line 185. Because it is good, in adjusting the interval of the two substrates 110, 120, that a height and a density of a pattern forming around the first substrate 110 where the first sealant is formed are made to be uniform. That is, since in the part where the first sealant overlaps among the upper part and the left terminal, the gate pad connection part 151 and the data pad connection part 152 are formed, it is preferred that the first sealant 190 is formed to overlap the common connection line 185 to have similar height and density like this in the right terminal and lower corner part of the LCD panel.

On the other hand, the embodiment of the present invention shown in FIGS. 8 and 9 can prevent the flicker by making the common voltage of both ends different each other and applying to end points of the gate line. However the ununiformity of the image can not be prevented.

Figure 10:
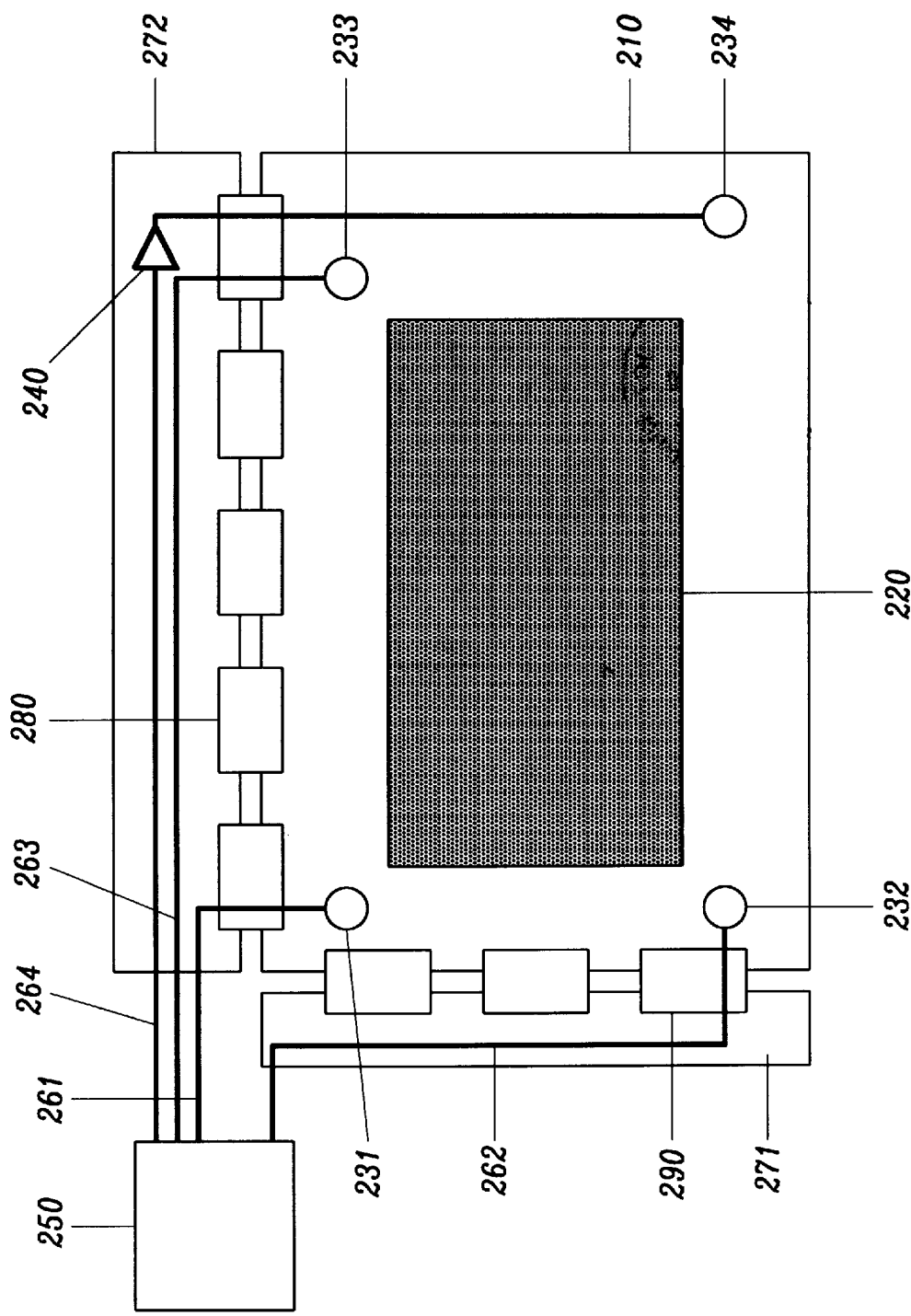
FIG. 10 roughly shows a structure of the LCD in accordance with a third embodiment of the present invention.

Next, a structure of a LCD according to the third embodiment of the present invention for preventing the flicker and the ununiformity of the image is described referring to FIG. 10.

In FIG. 10, in the upper part of the substrate 210, the data driver 280 for applying the data voltage is connected to a printed circuit board 272 (PCB) and in the left part of the substrate 210, the gate driver 290 for applying the gate voltage is connected to the PCB 271. The gate driver 290 and the data driver 280 are connected each to the gate line and the data line via the gate pad (is not shown) and the data pad (is not shown).

There is the display area 220 where a plurality of the pixel electrodes for representing the image signal are formed in the center of the substrate 210 and the first to the fourth contact points 231, 232, 233, 234 are formed in the corner of the substrate 210. The four contact points 231, 232, 233, 234 are connected to the common voltage generator 250 via the first to the fourth conducting wires 261, 262, 263, 264 respectively. The common voltage generator 250 is constituted to apply the different common voltages to the conducting wires 261, 262, 263, 264. The each conducting wire 261, 262, 263, 264 is connected to the each contact point via a dummy pin (is not shown) formed as a dummy in the driver 280, 290 through the PCB 271, 272.

Herein, the conducting wire connected to the contact point 234 in the right-lower part may be formed with a repair line for repairing shorts of the data lines on the substrate 210. Further, the operational amplifier is connected to the conducting wire 264, consequentially a short driving capability happening that the length of the conducting wire is long is compensated and a constant voltage is made to be applied to the contact point 234 formed in the right-lower part.

If an upper substrate (is not shown) is combined in the substrate 210, the contact points 231, 232, 233, 234 have contacts to the four corner of the common electrode (is not shown) formed on the upper substrate and the different common voltages which the common voltage generator 250 applies are transmitted to the common electrode. At this time, as mentioned above referring to FIG. 7, in order to prevent the ununiformity of the image caused by the delayed signal of the data line, it would be best to apply the different common voltages to both the end points of the data line in case that the data voltage is greater than the common voltage or not respectively. However, in the above case, there is inconvenience that the magnitude of the common voltage generated from the common voltage generator should be change in every time.

Therefore, in the LCD in accordance with the third embodiment of the present invention, the greater common voltage is applied to the contact point far away from the data driver 280 than the contact point close to the data driver 280. More specifically, the voltage applied from the common voltage generator 250 is adjusted to be raised in turn of the first contact point 231, the second contact point 232, in third contact point 233 and the fourth contact point 234.

In this case, since the common electrode formed with an indium tin oxide (is called as ITO) has an internal resistance, if the different common voltages are applied to each point of the common electrode, the voltage flow from a high point to a low point according to ohm's law and accordingly it happens the voltage drop and therefore the common voltage becomes changed with a predetermined slop from the high point to the low point.

Herein, the voltage difference between the first contact point and the fourth contact point is adjusted to keep the voltage difference between the common electrode and the pixel electrode constant in all over the display and therefore the pixel voltage turned reverse upward and downward is symmetric for the common voltage.

Next, the driving circuit for the LCD in accordance with the embodiment of the present invention is described.

Figure 11:
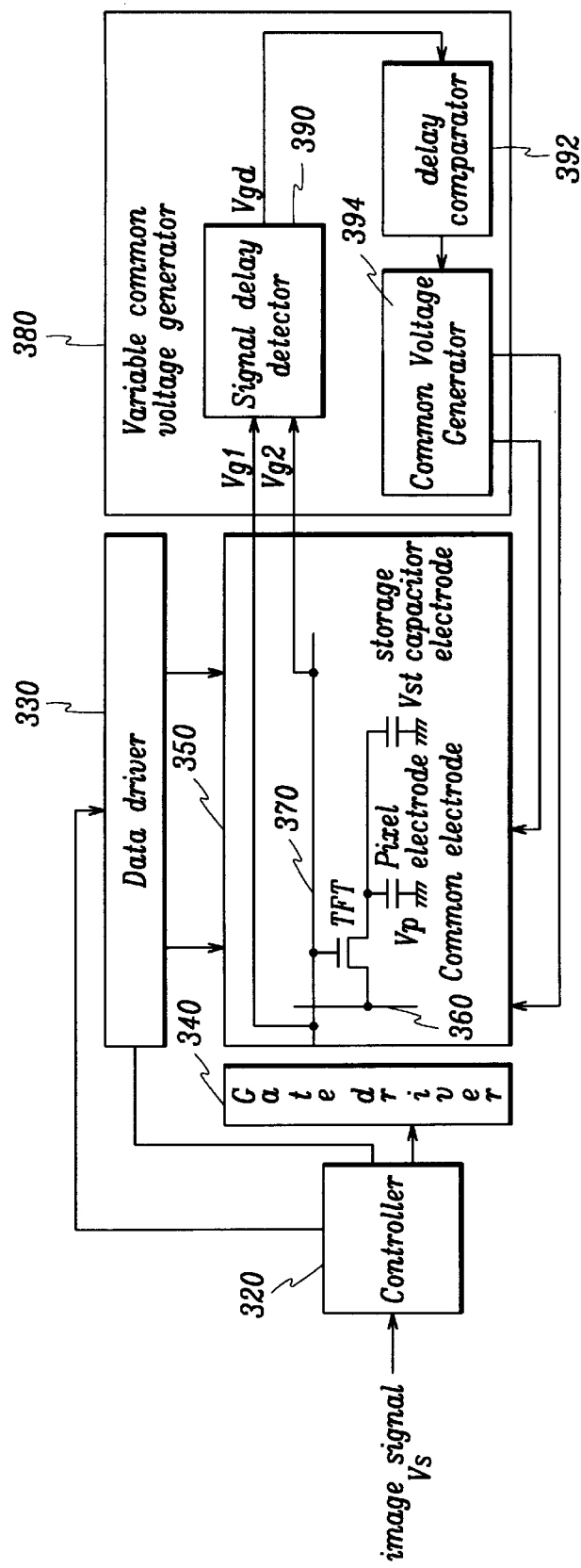
FIG. 11 shows a driving circuit for the LCD in accordance with the first embodiment of the present invention.

FIG. 11 shows the driving circuit for the LCD in accordance with the first embodiment of the present invention.

As shown in FIG. 11, a controller 320 receives the images signal Vs applied to the liquid crystal from a signal source (is not shown), generates the data signal from the image signal and sends it to the data driver 330, and makes timing signals needed in the driving circuit. The data driver 330 applies the data voltage to the each pixel of the LCD panel 350 according to the data signal input from the controller 320. The gate driver 340 outputs the gate voltage turning on the TFT 370 in each pixel to apply the data voltage to the pixel.

The data line 360 transmitting the data voltage from the data driver 330 and the gate line 370 which transmits the gate voltage and perpendicularly cross the data line are formed in the LCD panel 350. FIG. 11 shows only an equivalent circuit on a pixel in the liquid crystal 350. Herein, a voltage charged in the pixel electrode is represented as Vp and a voltage charged in the storage capacitor is represented as Vst. The common voltage variable generator 380 measures the gate voltage on the gate line, detects the delayed level of the gate voltage caused by the gate line and applies the common voltage to the common electrode (is not shown) of the panel 350 responsive to the delayed level.

The common voltage variable generator 380 comprises the signal delay detector 390, the delay comparator 392 and the common voltage generator 394.

The signal delay detector 390 measures the gate voltage Vg1, Vg2 in the former part and the latter part of the gate line respectively. As described above, the gate voltages Vg1, Vg2 have the voltage difference at a predetermined time according to the delayed signal caused by the gate line. Then, the signal delay detector 390 detects the voltage difference and transmits the detected value, a signal delay value Vgd, to the delay comparator 392.

Figure 12:
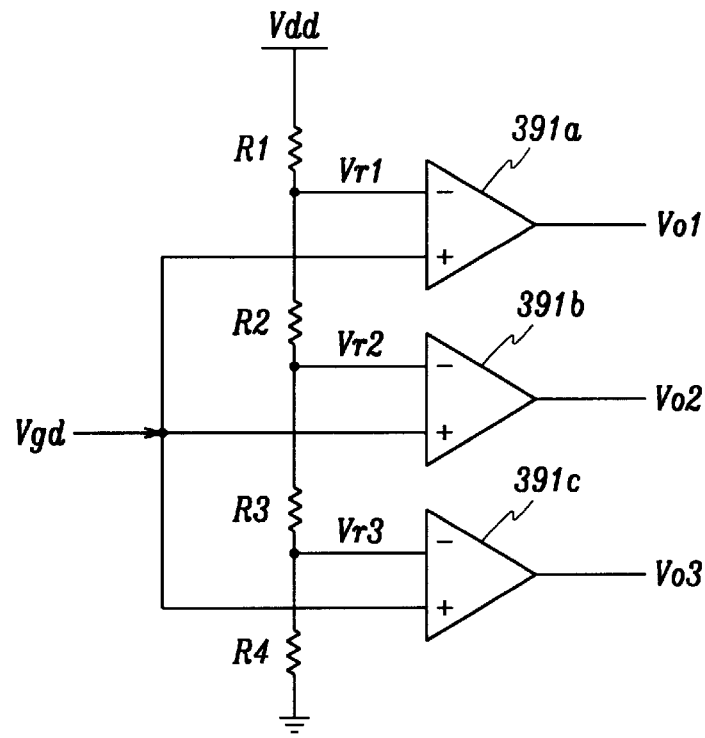
FIG. 12 shows a comparing delay means in FIG. 11 in detail.

The delay comparator 392 is to make the signal delay value Vgd digitized. FIG. 12 shows a detail circuit diagram of the delay comparator 392.

As shown in FIG. 12, the delay comparator 392 comprises a serially connected plurality of the resistors R1, R2, R3, R4, and comparators 391*a*, 391*b*, 391*c*. The supply voltage Vdd is made to be voltage drop by the resistors R1, R2, R3, R4 and becomes reference voltages Vr1, Vr2, Vr3 proportional to the resistance and the reference voltages Vr1, Vr2, Vr3 become reference values of the each comparator 391*a*, 391*b*, 391*c*. Each comparator 391*a*, 391*b*, 391*c* compares the reference voltages Vr1, Vr2, Vr3 with the signal delay value and outputs a logic signal of high or low level to output terminals Vo1, Vo2, Vo3. At this time, if the signal delay value is the highest, all of the output terminals Vo1, Vo2, Vo3 have the logic signal of high level and if the signal delay value is the smallest, all of the output terminals Vo1, Vo2, Vo3 have the logic signal of low level. The output signals of the output terminals Vo1, Vo2, Vo3 are applied to the common voltage generator 394.

Figure 13:
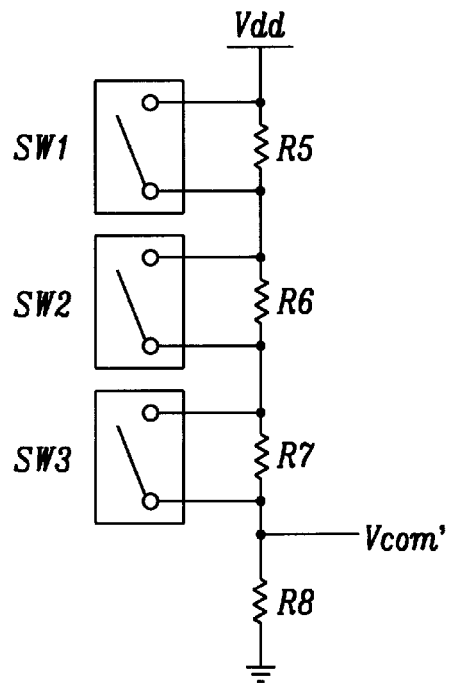
FIG. 13 shows a common voltage generator in FIG. 11 in detail.

FIG. 13 is a detailed circuit diagram of the common voltage generator 394.

The common voltage generator 394 comprises switches SW1, SW2 and resistors R5, R6, R7, R8. According to on/off state of each switch, divided voltage of Vdd, Vcom' is determined. The switches are turned on or off responsive to output levels of the delay comparator 392 and the Vcom' is determined.

In the LCD panel 350 in FIG. 11, the common voltage Vcom' is applied to one point of the common electrode substrate corresponding to the latter part of the gate line which the gate signal is delayed. As illustrated before, according to the signal delay of the gate line, the common voltage compensating the kick-back voltage can be applied to the pixel by applying the common voltage Vcom and Vcom' to an appropriate location of the common electrode substrate.

In the LCD driving circuit in accordance with the first embodiment of the present invention, it is illustrated that the voltage difference caused by the signal delay of the gate line is measured and the common voltage is varied using the above. Of course, the above can be applied to the data line.

Figure 14:
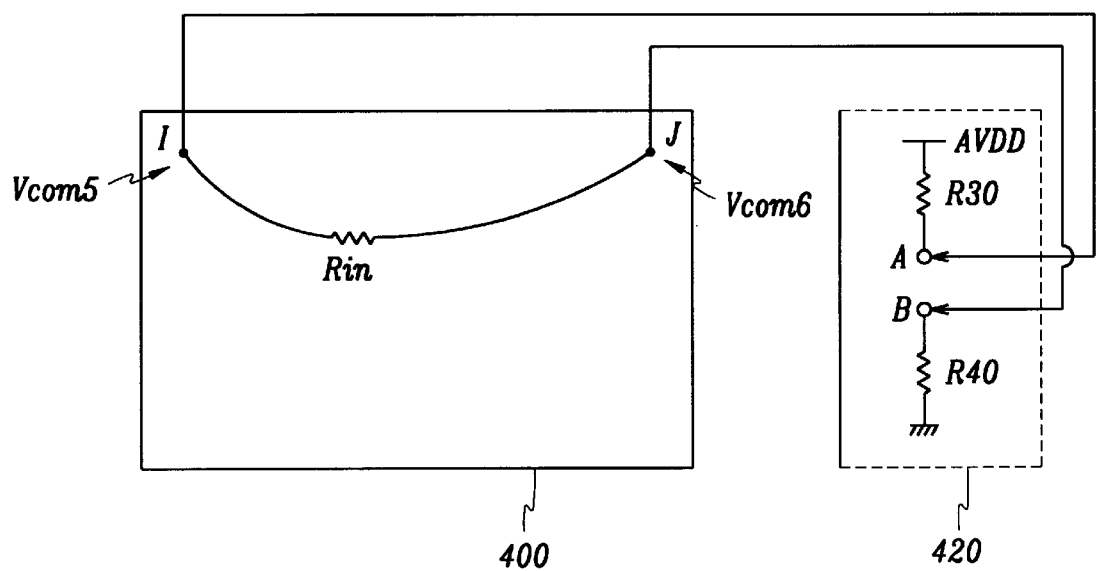
FIG. 14 shows a driving circuit for the LCD in accordance with the second embodiment of the present invention.

FIG. 14 shows the LCD driving circuit in accordance with the second embodiment of the present invention.

The second embodiment of the present invention in FIG. 14 is to replace the common voltage variable generator 380 with a common voltage generator 420 and in FIG. 14, the common voltage generator 420 mainly is shown.

In FIG. 14, different common voltages Vcom5, Vcom6 are applied to I, J points of the common electrode substrate 400 via the common voltage generator 420. At this time, according to the second embodiment of the present invention, the common voltage generator 420 applies the different common voltages to both the end points of the gate line using an internal resistance Rin in the ITO layer.

The common voltage generator 420, as shown in FIG. 14, comprises a resistor 30 having one terminal connected to the supply voltage AVDD and the other terminal coupled to a port A and a resistor 40 having one terminal connected to a port B and the other terminal grounded. Herein, the ports A and B are connected to the points I, J respectively.

Consequentially, the internal resistance Rin of the panel is connected between the port A and the port B and the resistor R30, Rin, R40 comes to be serial-connected.

Therefore, in the ports A and B, divided voltages which the supply voltage is divided by the resistors are generated and the divided voltages are applied to the points I, J as the common voltage Vcom5, Vcom6. At this time, the common voltage Vcom5, Vcom6 are as follows.

$$com5 = \frac{Rin + R40}{R30 + Rin + R40} \times AVDD$$

$$com6 = \frac{R40}{R30 + Rin + R40} \times AVDD$$

A method to generate the common voltage using the internal resistance of the panel consumes less power than a method to generate the common voltage dividing the supply voltage without using the internal resistance of the panel.

Of course, the present invention is not restricted to the embodiments and various changes can be available.

As illustrated above, in accordance with the present invention, by applying the different common voltages to both the end points of the gate line, the flicker caused by the delayed signal of the gate can be prevented. Further, by applying the different common voltages to both the end points of the data line, the ununiformity of the image quality caused by the delayed signal of the data voltage can be overcome.

What is claimed is:

1. A liquid crystal display comprising:
   a first substrate which includes a plurality of gate lines, a plurality of data lines insulated and crossed the gate lines, a plurality of thin film transistors, each transistor having a gate electrode connected to one of the gate lines and a source electrode connected to one of the data lines, and the pixel electrodes connected to drain electrodes of the thin film transistors;
   a second substrate which includes a common electrode facing the pixel electrode;
   a gate driver for applying a gate voltage turning on/off the thin film transistor to the gate lines; and
   a data driver for applying a data voltage representing an image signal to the data lines; wherein, different common voltages are applied to the common electrode at positions corresponding to both end portions of the gate line.

2. The liquid crystal display according to claim 1 wherein the smaller common voltage is applied to the common electrode close to the gate driver than the common electrode far away from the gate driver.

3. The liquid crystal display according to claim 1, wherein the different common voltages are applied to the positions of the common electrode corresponding to both end points of the data line.

4. The liquid crystal display according to claim 3, wherein if the data voltage is greater than the common voltage, the smaller common voltage is applied to the common electrode far away from the data driver than the common electrode close to the data driver, and if the data voltage is smaller than the common voltage, the greater common voltage is applied to the common electrode far away from the data driver than the common electrode close to the data driver.

5. The liquid crystal display according to claim 1, wherein the different common voltages are applied to four corners of the common electrode.

6. A liquid crystal display comprising:
- a first substrate which includes a plurality of gate lines, a plurality of data lines insulated and crossed the gate lines, a plurality of thin film transistors, each transistor having a gate electrode connected to one of the gate lines and a source electrode connected to one of the data lines, and the pixel electrodes connected to drain electrodes of the thin film transistors, is rectangular made up of a first to a fourth edge;
- a second substrate which includes a common electrode facing the pixel electrode;
- a gate pad and a data pad each formed on the first edge and the second edge of the first substrate and each connected to the gate lines and the data lines;
- a first sealant for attaching the first substrate to the second substrate, the first sealant which is formed in the third edge and has a liquid crystal injection hole for pouring a liquid crystal;
- a second sealant formed on the liquid crystal injection hole and for sealing the liquid crystal after pouring the liquid crystal;
- first through fourth common electrode points which are formed on four corners of the common electrode in the second substrate respectively a receive different common voltages when the display is active to;
- a dummy pad connected to the first, the second, the third common electrode points and for receiving the different common voltages; and
- a common connection line for connecting the third and the fourth electrode points formed on the third edge of the second substrate.

7. The liquid crystal display according to claim 6, wherein the common connection line is formed to expose the second sealant.

8. The liquid crystal display according to claim 7, wherein the first edge faces the third edge each other a first common voltage is applied to the common electrode point formed on the third edge and a second common voltage is applied to the common electrode point formed on the first edge.

9. The liquid crystal display according to claim 8, wherein the first common voltage is greater than the second common voltage.

10. The liquid crystal display according to claim 6, wherein the first sealant formed on the third edge of the first substrate is formed along with the common connection line.

11. The liquid crystal display according to claim 10, wherein a part corresponding to the liquid crystal injection hole among the common connection line is more narrow than the other part of the common connection line.

12. A liquid crystal display comprising:
- a first substrate which includes a plurality of gate lines, a plurality of data lines insulated and crossed the gate lines, a plurality of thin film transistors, each transistor having a gate electrode connected to the gate lines and a source electrode connected to one of the data lines, and the pixel electrodes connected to drain electrodes of the thin film transistors and is rectangular;
- a gate pad which is formed on the first substrate and connected to the gate lines, receives a gate voltage for turning on/off the thin film transistor;
- a data pad which is formed on the first substrate and connected to the data lines, receives a data voltage representing an image signal;
- a display area showing the image signal and comprising a set of pixels in a matrix type defined as an intersection part of the gate lines and the data lines in the first substrate;
- a second substrate which includes a common electrode facing the pixel electrode;
- four contact points formed adjacent to four corners of the display area and having an electrical contact with the common electrode;
- a common voltage generator that simultaneously applies different common voltages to the four electrode points; and
- four connection lines for connecting the four contact points with the common voltage generator respectively.

13. The liquid crystal display according to claim 12, wherein the connection line connected to the farthest located contact point from both the gate pad and the data pad, and the common voltage generator further comprises an operational amplifier.

14. The liquid crystal display according to claim 12, wherein the voltage which the common voltage generator applies to the four contact points is the first highest in the farthest located contact point from both the data pad and the gate pad, the second highest in the contact point close to the data pad and far away from the gate pad, the third highest in the contact point far away from the data pad and close to the gate pad and the lowest in the contact point close from both the data pad and the gate pad.

15. A liquid crystal display comprising:
- a first substrate which includes a plurality of gate lines, a plurality of data lines insulated from and crossing the gate lines, a plurality of thin film transistors, each transistor having a gate electrode connected to one of the gate lines and a source electrode connected to one of the data lines, and pixel electrodes connected to drain electrodes of the thin film transistors;
- a second substrate which includes a common electrode facing the pixel electrodes;
- a gate driver for applying a gate voltage to a gate line in the plurality thereof;
- a data driver for applying a data voltage representing an image signal to a data line in the plurality thereof; and
- a voltage generator for applying different common voltages to the common electrode, said voltage generator comprising a signal delay detector for detecting a delayed gate voltage from a gate line, a delay comparator for converting the delayed gate voltage detected from the signal delay detector into a digital signal and a common voltage generator for generating a common voltage compensating the delayed gate voltage according to the digital signal input from the delay comparator.

16. The liquid crystal display according to claim 15, wherein the signal delay detector detects gate voltages from the former part and the latter part of the gate line and detects a voltage difference of the gate voltages.

17. The liquid crystal display according to claim 16, wherein the delay comparator comprises:
- a plurality of resistors generating different reference voltages;
- a plurality of comparators receiving the delayed gate voltage and the reference voltage, comparing the two voltage values and outputting a result of comparing the two voltage values as a digital signal.

18. The liquid crystal display according to claim 17, wherein the common voltage generator comprises:
- a plurality of switches receiving the digital signal output from the comparators; and
- a plurality of resistors selectively being short responsive to an operation of the switches thereby selecting one of the predetermined common voltages the selected common voltage is applied to a point of the common electrode corresponding to a latter part of the gate line.

19. The liquid crystal display according to claim 15, wherein the voltage generator comprises:
- a supply voltage;
- a first resistor having one terminal connected to the supply voltage; a first port connected to the other terminal of the first resistor and a first point of the second substrate corresponding to a former part of the gate line;
- a second port connected to a second point of the second substrate corresponding to a latter part of the gate line; and
- a second resistor having one terminal connected to the second port and the other terminal grounded.

* * * * *